Nov. 16, 1965 P. STAMBORSKI 3,218,099
WEED PULLER
Filed Dec. 5, 1963
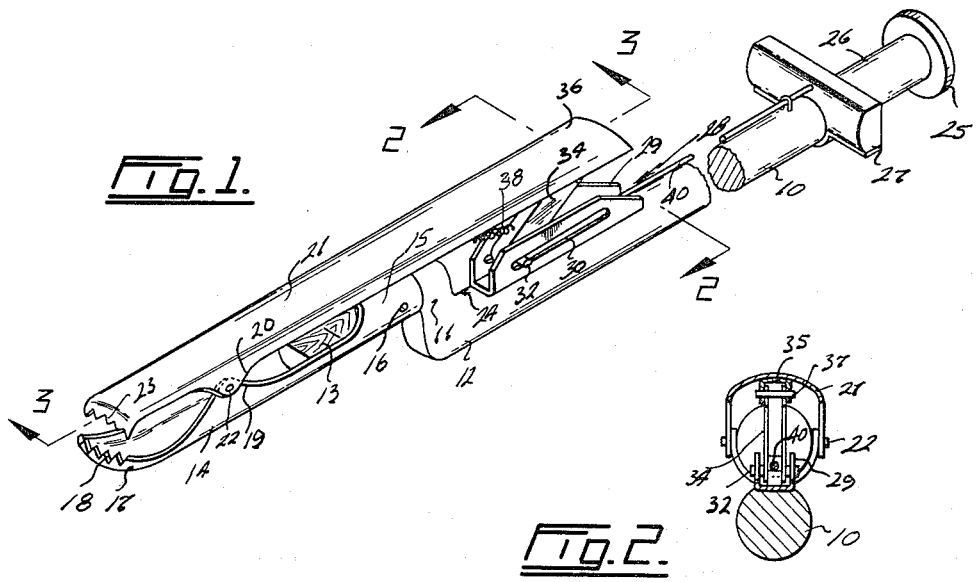
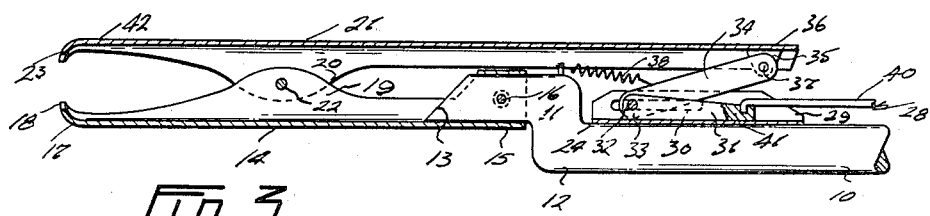
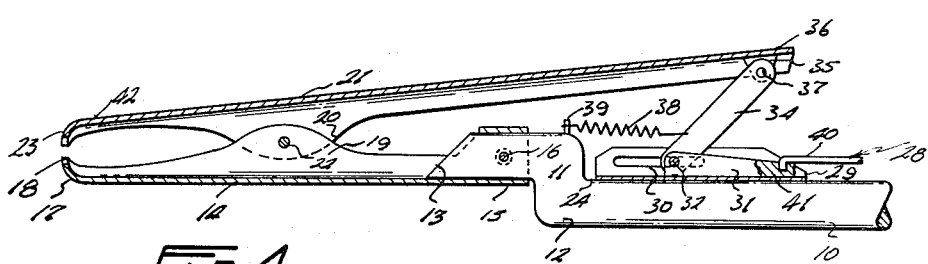

United States Patent Office 3,218,099
Patented Nov. 16, 1965

3,218,099
WEED PULLER
Paul Stamborski, Box 1406, Atikokan, Ontario, Canada
Filed Dec. 5, 1963, Ser. No. 328,311
4 Claims. (Cl. 294—19)

My invention relates to new and useful improvements in weed pulling devices, particularly devices adapted to be used by an operator without the necessity of bending down.

The principal object and essence of my invention is to provide a weed pulling device which can readily be manipulated by one hand and without the operator having to bend down.

Another object of my invention is to provide a device of the character herewithin described which includes novel leverage and linkage so that a relatively small movement of the manipulative means provides sufficient movement of the jaws together with sufficient pressure in order to engage the weed prior to pulling thereof.

Yet another object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a perspective view of my device.

FIGURE 2 is a section of FIGURE 1 along the line 2—2 thereof.

FIGURE 3 is a side elevation (partially sectioned) of the device substantially along the line 3—3 of FIGURE 1, and with the device shown in the open position.

FIGURE 4 is a view similar to FIGURE 3 but with the device shown in the partially closed or weed gripping position.

In the drawings like characters of reference indicate corresponding parts in the different figures.

It is well known that weeds are difficult to pull by hand due to the fact that the individual has to bend down in order to grasp the weed firmly. Some devices have been produced in the form of a cork screw in an attempt to facilitate the pulling of weeds but these are only of use on specific weeds having a relatively long tap root.

Conventional weeds in lawns and gardens merely require to be grasped around the stem and below the leaves so that they can be pulled upwardly with a slight twisting action to remove them from the soil.

The device hereinafter to be described is such a device and enables weeds to be pulled readily and easily by an individual without the necessity of bending or stooping.

Proceeding therefore to describe my invention in detail, reference should first be made to the accompanying drawings in which reference character 10 illustrates a cylindrical handle having an upwardly stepped portion 11 situated at the end 12 and continuing to form the jaw holding extension 13 as clearly shown in FIGURE 1.

A fixed jaw 14 is formed within a cylindrical end 15 adapted to engage over the portion 13 of the handle and to be secured thereto by means of pivot pin 16.

The weed grasping end 17 of the jaw is arcuately curved when viewed in cross section and is provided with serrated teeth 18 upon the end thereof also is clearly illustrated in FIGURE 1.

Movable jaw carrying wings 19 are provided along the length of the fixed jaw 14, said wings being engageable by corresponding wings 20 of a movable jaw 21, pivot pin 22 pivoting the movable jaw 21 to the fixed jaw 14 intermediate the ends thereof as clearly illustrated. The movable jaw 21 is also provided with serrated teeth 23 on the distal end thereof, in opposition to the aforementioned serrated teeth 18 on the fixed jaw 14.

When in the open position illustrated in FIGURES 1 and 3, the semi-cylindrically curved movable jaw overlies the extension 13 of the handle and extends to overlie, in spaced relationship, the upper surface 24 of the handle 10.

A palm receiving knob 25 is secured to the end 26 of the handle and a cross piece 27 is slidably mounted for movement along the length of the handle, adjacent the palm engaging portion 25 so that the first and second fingers of the operator can engage over each end of the cross piece 27 for movement thereof along the handle.

Linkage collectively designated 28 extends between the manipulative cross portion 27 and the movable jaw 21.

This linkage includes a guide sleeve 28 secured to the upper surface 24 of the lower stepped portion of the handle 10 and comprising a pair of spaced and parallel side plates 29 having longitudinal slots 30 formed therein.

A block 31 is mounted between the side flanges 28 and is adapted to slide therein, upward movement thereof being prevented by the pin 32 which extends through slot 30 and through one end 33 of the block 31.

A pair of links 34 also engage pin 32 by the lower ends thereof, the upper ends being pivotally connected to flanges 35 extending from the end 36 of the movable jaw, pivot pin 37 providing this pivotal connection.

Finally a return spring 38 extends between the links 34 and on the handle, a pin 39, said spring normally maintaining the jaws in the open position.

In operation, the jaws are engaged around the weed to be pulled, whereupon the manipulative cross portion 27 is moved by the fingers of the operator towards the palm engaging knob 25. A link wire or rod 40 extends between this cross member 27 and end 41 of the slide block 31, so that the slide block is moved rearwardly within the guide sleeve 28 thus pulling the lower ends of link plates 34 rearwardly which in turn elevates the rear end 36 of the movable jaw and causes the distal end 42 to close towards the fixed jaw 14 thus grasping the weed with good leverage and pressure to enable it to be withdrawn from the ground.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A weed puller comprising in combination an elongated handle, a fixed jaw portion secured to and extending from one end of said handle, a movable jaw pivoted between the ends thereof to said fixed jaw, said point of pivot being spaced from the distal end of said fixed jaw, manipulative means on said handle adjacent the end opposite to said fixed jaw, and linkage extending between said manipulative means and said movable jaw to open and close said jaw with respect to said fixed jaw, said linkage including a guide sleeve secured to said handle intermediate the ends thereof, a block slidable lengthwise in said sleeve, link plates extending between one end of said block and the other end of said movable jaw, and a link extending between the other end of said sleeve and said manipulative means, said block including a pair of longitudinal slots formed in the sides thereof, a pin extending through said slots and through said block and said link plates, and a return spring extending between said link plates and said handle normally biasing said jaws to the open position.

2. The device according to claim 1 in which said jaws are provided with serrated edges on the ends thereof, said manipulative means comprising a finger engaging portion engaging over said handle and slidable lengthwise on said handle between limits.

3. The device according to claim 1 in which said handle is upwardly stepped when viewed in side elevation, thereby forming an upper portion and a lower portion, said portions having upper and lower surfaces, said linkage being secured to said upper surface of said lower portion of said handle.

4. The device according to claim 2 in which said handle is upwardly stepped when viewed in side elevation, thereby forming an upper portion and a lower portion, said portions having upper and lower surfaces, said linkage being secured to said upper surface of said lower portion of said handle.

References Cited by the Examiner
UNITED STATES PATENTS

| | | | |
|---|---|---|---|
| 349,394 | 9/1886 | Heidt | 294—104 X |
| 582,293 | 5/1897 | Koester | 294—19 X |
| 1,021,790 | 4/1912 | Newville | 194—104 |
| 2,761,277 | 9/1956 | Holbrook | 74—105 X |

SAMUEL F. COLEMAN, *Primary Examiner.*